United States Patent [19]

Wildhaber

[11] 4,133,187
[45] Jan. 9, 1979

[54] FLEXIBLE-DISK COUPLING

[76] Inventor: Ernest Wildhaber, 124 Summit Dr., Rochester, N.Y. 14620

[21] Appl. No.: 757,364

[22] Filed: Jan. 6, 1977

[51] Int. Cl.² .............................................. F16D 3/78
[52] U.S. Cl. .................................. 64/13; 64/15 B
[58] Field of Search ........................ 64/13, 15 R, 15 B

[56] References Cited

U.S. PATENT DOCUMENTS

| 3,800,557 | 4/1974 | Tobin | 64/13 |
| 3,808,837 | 5/1974 | Anderson | 64/15 R |
| 4,044,571 | 8/1977 | Wildhaber | 64/13 |

FOREIGN PATENT DOCUMENTS 361994  4/1921  Fed. Rep. of Germany ............... 64/13

Primary Examiner—Samuel Scott
Assistant Examiner—R. C. Turner

[57] ABSTRACT

This flexible-disk coupling contains at least one disk attached at its outside to one of the two rotary parts connected therewith and is splined adjacent its inside periphery to the other of said parts. The splines let the disk expand naturally under centrifugal stress, independently of said other part. They have preferably straight radical profiles, so that the increased expansion of the disk avoids backlash. The couplings may be used in pairs, as common-place, or also singly.

The flexible disks are subjected to various stresses, of which the stress set up by centrifugal inertia is a major component. It is customary to rigidly weld the disks at their inner portion to one of the two parts connected by the coupling. The invention departs from this custom. It lets the disks expand naturally without being tied to the expansion of said one part. As this decreases the stress on the disks it enables them to carry increased load.

5 Claims, 8 Drawing Figures

FLEXIBLE-DISK COUPLING

The invention will be described in connection with the accompanying drawings, in which FIG. 1 is an axial section of a flexible disk connected with splines to said one part, and partly a radial view thereof.

Figure 1:
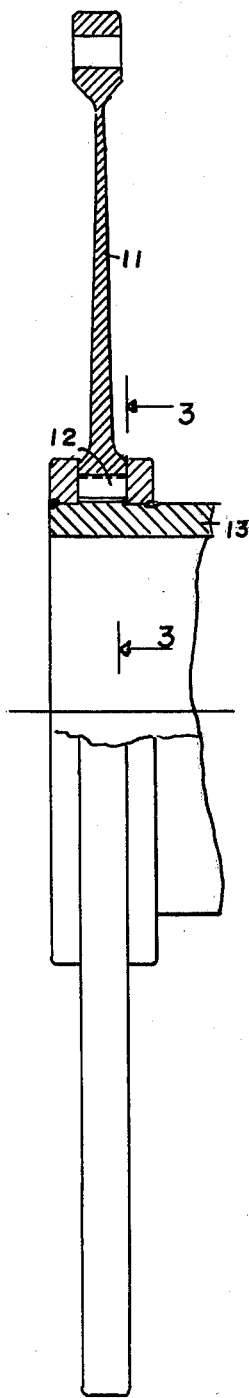

FIG. 1 shows in axial section a generally conventional disk 11, except for its splines 12 that connect its inmost portion with rotary part 13.

Figure 2:
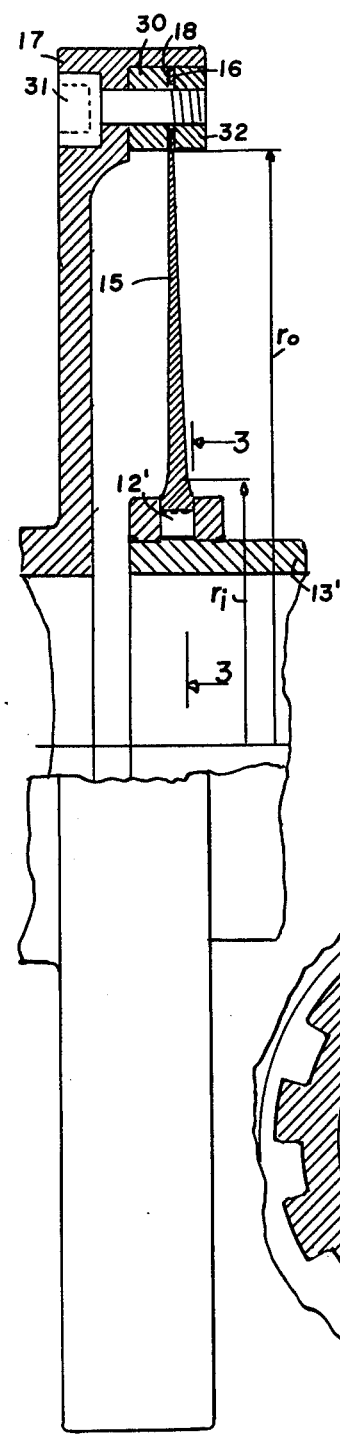
FIG. 2 is an axial section of a flexible disk modified at its outer portion, and partly a radial view thereof.

FIG. 2 is an axial section of a modified disk 15, with splines 12' engaging rotary part 13'. It has a relatively thin outmost portion 16 secured to rotary part 17.

Figure 3:
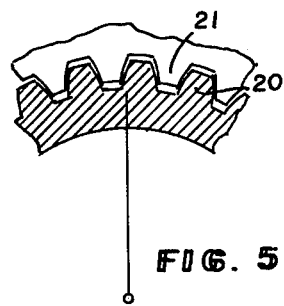
FIG. 3 is a cross-section taken along lines 3—3 of FIG. 2, also of FIGS. 1 and 6.

FIG. 3 is a cross-section showing the splines 12' (or 12) at stand-still.

Figure 4:
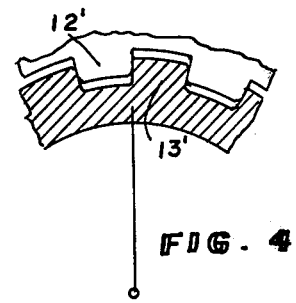
FIG. 4 is a similar cross-section showing an increased expansion of the disk over that of said one part, due to centrifugal action.

FIG. 4 shows said splines at top rotating speed. Here the internal splines of the disk have expanded more than the external splines of shaft or part 13'. Note that the splines have straight radial side profiles along which the internal splines may expand with respect to the external splines, without introducing backlash.

While I prefer radial spline profiles, as shown, the effect can be partly approached when the mean profile inclination to the radial direction is within ten degrees, as indicated by dotted lines in FIG. 3.

Figure 5:
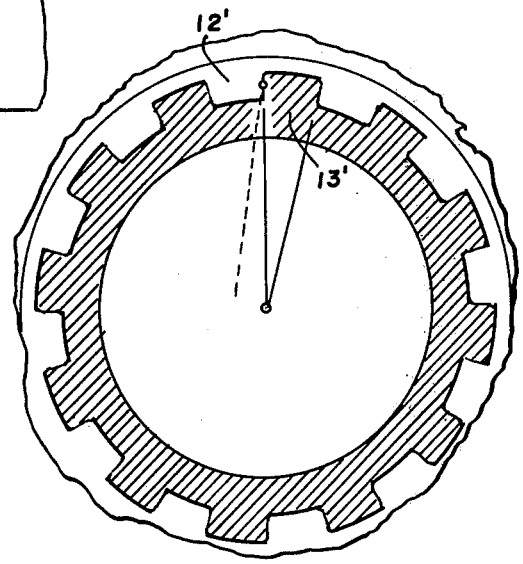
FIG. 5 is a cross-section similar to FIG. 4, but showing conventional involute splines, that introduce backlash and looseness.

FIG. 5 shows fragmentarily conventional involute splines 20 at top rotating speed. The internal teeth or splines 21 have moved outwardly in radial direction, so that backlash is introduced.

Returning to FIG. 2, it illustrates one of many ways of connectng the outmost portion of disk 15 with rotary part 17. A ring-shaped sheet 18 of yeilding rubber-like material is bonded to said portion and to a metal ring 30 that is held on part 17 by screws 31 with recessed heads. The screws thread into an outer ring 32 and keep sheet 18 under pressure. Sheet 18 lets the outer disk portion and ring 30 expand differently.

However, if desired, sheet 18 may be omitted.

The principal novelty lies in the spline connection at the inmost portion of the disk, such that expansion does not introduce backlash and stresses are reduced.

The thickness of disk 11 or 15 decreases towards the outside. The disk profile in axial section may be slightly concave or also straight. The flexible working portion of the disk starts at a radius $r_i$ of at least one third of its outmost radius $r_o$, (FIG. 2).

Figure 6:
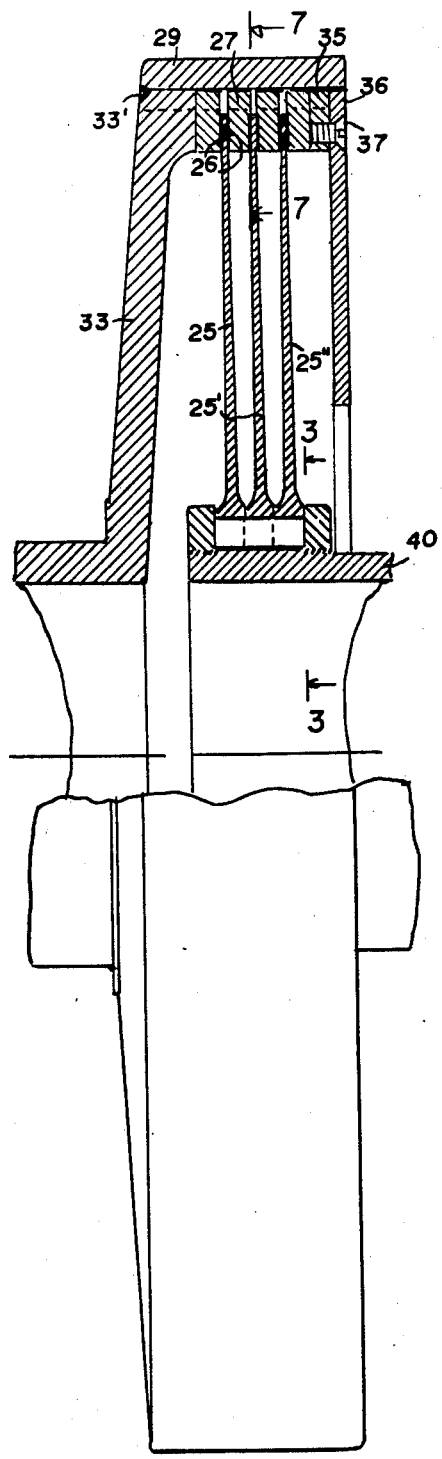
FIG. 6 is an axial section of a coupling containing a plurality of closely adjacent disks splined to a common shaft, and partly a radial view thereof.

The disposition shown in FIG. 6 avoids excessive stresses of the several disks 25, 25', 25" by connecting the outer portions of the disks through rubber-like layers 26 with rings 27, to permit slightly different expansion of the disks.

Figure 7:
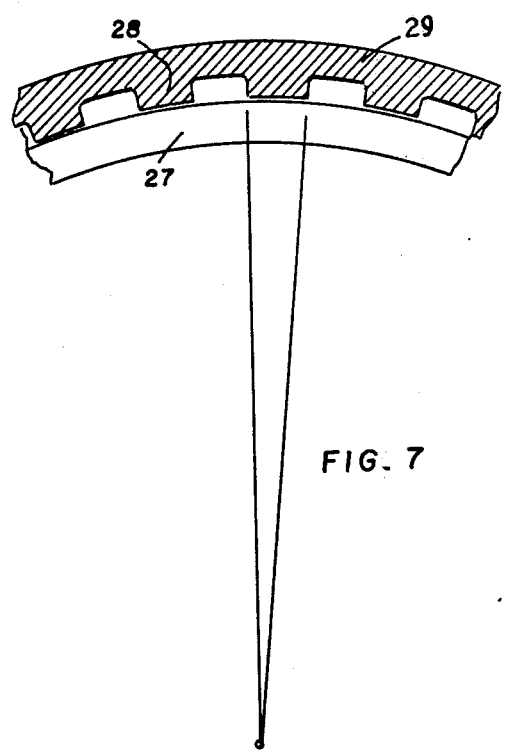
FIG. 7 is a fragmentary section taken at right angles to the coupling axis, along lines 7—7 of FIG. 6.
Figure 8:
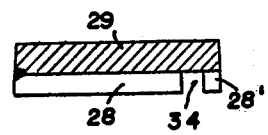
FIG. 8 is an axial section showing sleeve 29 separately.

The rings 27 engage straight splines 28 provided internally in a cylindrical sleeve 29, see also FIG. 7. Splines 28 preferably have straight radial sides. A cross-section of sleeve 29 is shown separately in FIG. 8. It is rigid with rotary part 33 that engages splines 28 and is welded at 33' to sleeve 29. The splines 28 have a gap 34 (FIG. 8) adjacent one end. A ring 35 with splines matching splines 28 is axially moved into gap 34, and is then turned on its axis to align its splines with the splines 28. It is then secured to end plate 36 by screws 37. The splines provided on said end plate engage the end portion 28' of the splines 28, to retain it in a fixed angular position on sleeve 29. In this way ring 35 is axially fixed on sleeve 29. And together with part 33 they hold the assembly of rings 27 and disks 25 in a fixed axial position on sleeve 29.

The inmost portions of the disks 25, 25', 25" are splined in the way described with FIGS. 3 and 4 to part 40, to which part 33 is connected by the coupling. The disks are stressed nearly equally, due to the yielding layers 26.

I claim:

1. A flexible-disk coupling for connecting two rotary parts, containing
    a flexible disk attached adjacent its outside periphery to one of said parts and adjacent its inside periphery to the other of said parts,
    the latter connection being with splines having straight radial sides intersecting, when extended, the axis of said other part, to allow the internal splines to expand more than the mating external splines while maintaining contact between the mating splines without introducing backlash.

2. A flexible-disk coupling for connecting two rotary parts, containing
    a flexible disk attached adjacent its outside periphery to one of said parts and adjacent its inside periphery to the other of said parts,
    the latter connection being with splines,
    the splines of said other part increasing in width with increasing radial distance from the axis of said other part,
    the inside radius of the flexing disk portion being at least one third of the outside radius of said portion.

3. A flexible-disk coupling according to claim 2, wherein the flexible disk is attached adjacent its outside periphery to one of the two rotary parts through a sheet of rubber-like material.

4. A flexible-disk coupling according to claim 2, wherein a plurality of adjacent disks are splined to one of the two parts of the coupling.

5. A flexible-disk coupling according to claim 4, wherein a plurality of adjacent disks are splined adjacent their inside end to one of the two part of the coupling,
    said disks are connected adjacent their outside periphery with the other of said parts through yielding rubber-like layers.

* * * * *